3,316,931
CRYOGENIC TRANSFER METHOD AND APPARATUS
Charles W. Elrod, Dayton, Ohio, assignor to the United States of America as represented by the Secretary of the Air Force
Filed Aug. 18, 1964, Ser. No. 390,492
2 Claims. (Cl. 137—339)

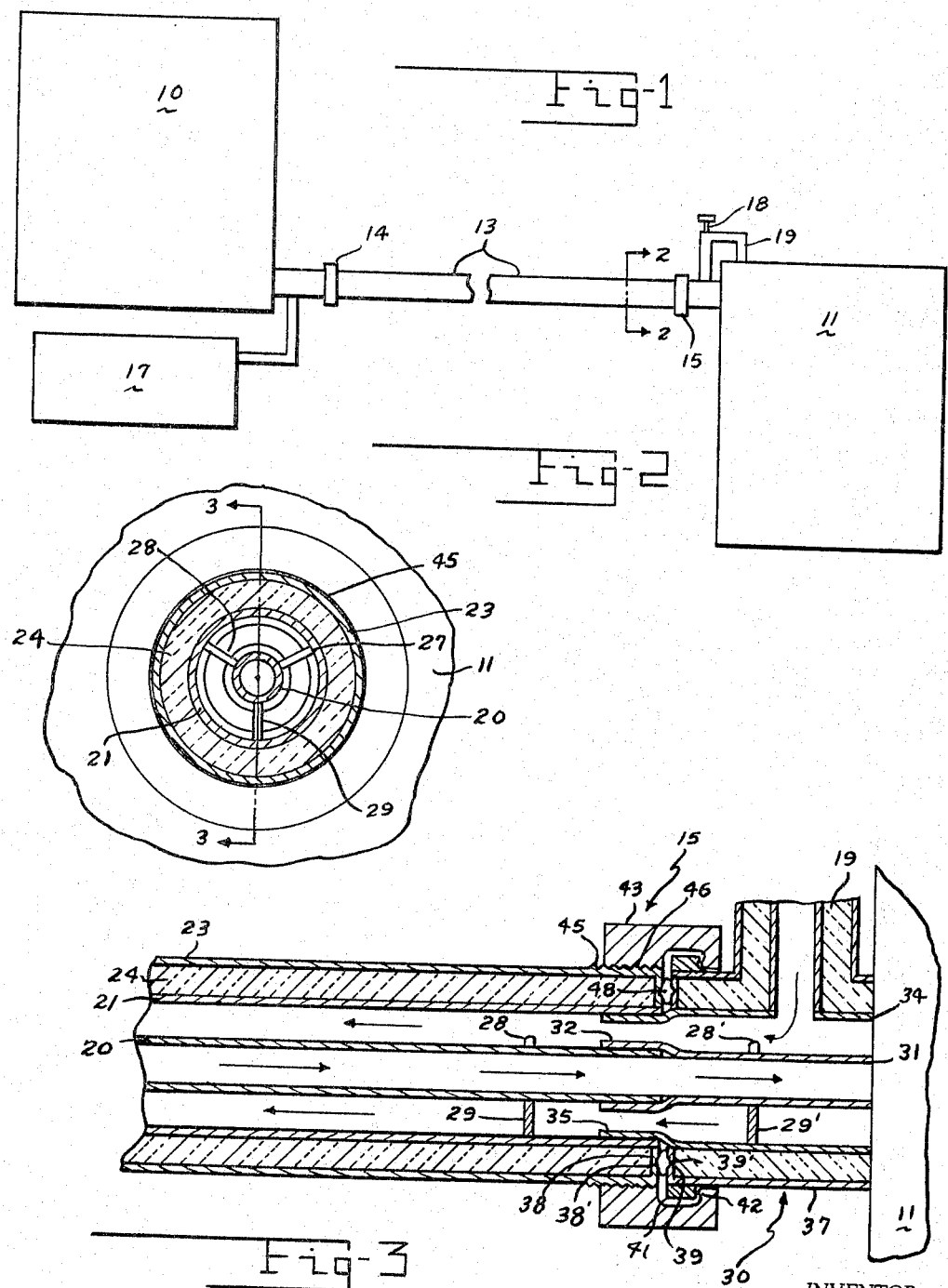

The invention described herein may be manufactured and used by or for the United States Government for governmental purposes without the payment to me of any royalty thereon.

This invention relates to a method and apparatus for transferring slush hydrogen or other cryogens to a storage vessel or aerospace vehicle.

One object of the invention is to provide a method for transferring slush hydrogen to a storage vessel or aerospace vehicle which will reduce the losses of solid hydrogen due to heat leak during the transfer operation.

Another object of the invention is to provide an apparatus for use in the transfer of slush hydrogen to a storage vessel or aerospace vehicle which make use of counterflow liquid and gaseous hydrogen to reduce the losses of solid hydrogen due to heat leak.

These and other objects will be more fully understood from the following detailed description taken with the drawing, wherein:

FIG. 1 is a schematic view of a transfer system for transferring slush hydrogen from a supply vessel to a receiving vessel;

FIG. 2 is an enlarged sectional view of the transfer line of FIG. 1 taken along the line 2—2 with a cutaway portion of the receiving vessel shown;

FIG. 3 is a sectional view of the transfer line of FIG. 2 taken along the line 3—3.

In transferring slush hydrogen, that is solid hydrogen in a liquid hydrogen carrier, from a supply Dewar vessel to a receiving vessel such as a storage vessel or an aerospace vehicle, gaseous hydrogen produced during cooldown must be returned to the supply system for reprocessing. Also it is desirable to return some of the liquid carrier to the supply to permit a maximum storage of solid hydrogen in the receiving vessel. Since solid hydrogen is expensive to produce it is desirable to reduce heat leak to the solid hydrogen during the transfer operation. This is accomplished according to this invention by locating the slush hydrogen transfer line within the return line so that the returning gaseous and liquid hydrogen will reduce the heat leak to the slush hydrogen. A third line surrounds the return line and the space between the third line and the return line is either a vacuum space or a super insulated volume.

Reference is now made to FIG. 1 of the drawing which shows a supply vessel at 10 and a storage vessel at 11 connected by means of a transfer line 13. Line 13 is coupled to the supply vessel 10 by a coupling means 14 and to storage vessel 11 by a coupling 15 as will be explained later. A pump, not shown, may be provided where needed if gravity feed is not used. The returning liquid and gas is fed to a storage tank 17 for reprocessing. A valve 18 is provided in the return connecting line 19.

As shown in FIG. 2 the transfer line 13 consists of an inner conduit 20 surrounded by an outer conduit 21. The outer conduit 21 is surrounded by a pipe 23. The space 24 between the conduit 21 and pipe 23 is either evacuated or filled with insulation such as fiber glass, and aluminum foil. The inner conduit 20 is supported within the outer conduit 21 by means of spacer supports located 120 degrees apart shown at 27, 28 and 29. Such spacers are located along the transfer line as needed.

The transfer line is coupled to the receiving vessel input line 30 as shown in FIG. 3. The inner conduit member 31 has an enlarged female end portion 32 for receiving the male end portion of member 20 of the transfer line 13. The outer conduit 34 has a reduced female end portion 35 for fitting into the male end portion of member 21 of the transfer line 13. Outer pipe member 37 and pipe member 23 have turned over end members 38 and 39 which connect to the outer conduits 21 and 34. A flange 41 is provided on member 37 for receiving projection 42 on a standard union coupling member 43. The pipe member 23 has a threaded end portion 45 for engaging the threaded portion 46 of coupling member 43. An O-ring seal 48 is provided and fits into the indentations 38' and 39' between end portions 38 and 39. The coupling means between the supply tank and the transfer line is substantially the same as the coupling means just described, except that the transfer line 13 has the fittings as shown on input line 30 and the output line of vessel 10 has the fittings as shown on the transfer line 13. Since the two coupling means are the same, only one has been described in detail. When the transfer line is connected between the supply vessel and the storage vessel or aerospace vehicle the O-ring 48 is placed between member 38 and 39 of transfer line 13 and input 30. The male member 32 and the female member 35 of the input line 30 are then inserted between the inner and outer conduits 20 and 21 of the transfer line and the lines are brought together to hold the O-ring in place. The coupling member is then threaded onto the outer pipe 23 and tightened to seal the line.

With the coupling 14 connected in the same manner the slush hydrogen is then permitted to flow into the receiving vessel through conduit 20 by opening valve, not shown, or starting a pump, not shown. The gas formed by the initial cooldown of the transfer line and receiving vessel is returned to the storage tank 17 through conduit 21 in the space between conduit 20 and 21. The valve 18 is left wide open for rapid filling of the receiving vessel, but for slower filling may be closed down after the initial gas flow to reduce the pressure in the return line to aid in reducing heat flow to the slush hydrogen. After initial cooldown and the receiving vessel is substantially filled with slush hydrogen, the slush hydrogen continues to flow into the storage vessel. The solid hydrogen will settle out and force a portion of the liquid hydrogen to return to tank 17 through conduit 21 leaving mostly solid hydrogen in the storage vessel 11. The returning gas and liquid hydrogen in conduit act as a cold barrier to reduce heat leak to the slush hydrogen in the inner conduit 20. While a separate vessel 17 is shown, the returned gas and the liquid hydrogen could be returned to the vessel 10. It could then be removed for reprocessing in any desired manner.

There is thus provided a method and apparatus for transferring slush hydrogen or other cryogens to a storage vessel or aerospace vehicle which reduces losses of solid hydrogen or other cryogens due to heat leak.

While a certain specific embodiment has been described in detail it is obvious that numerous changes may be made without departing from the general principles and scope of the invention.

I claim:

1. A coupling device for a cryogenic transfer line comprising: a first conduit member; a second conduit member having a reduced end portion snugly fitting inside of said first conduit member; a third conduit member, supported within and spaced from said first conduit member; a fourth conduit member supported within and spaced from said second conduit member and having an enlarged end portion snugly surrounding said third conduit member; a first pipe member surrounding said first conduit member and having a substantially radially positioned bent over end portion attached to said first conduit member; a second pipe member surrounding said second conduit member and having a substantially radially positioned bent over end portion attached to said second conduit member; an O-ring seal located between the bent over end portions of said pipe members; one of said pipe members having external threads adjacent said bent over end portion; the other of said pipe members having an external flange secured thereto adjacent said bent over end portion; a coupling means engaging said flange and having internal threads engaging the threads on said one of said pipe members.

2. An apparatus for transferring slush cryogens from a supply vessel to a receiving vessel comprising: a transfer line having a first inner conduit, a second conduit surrounding said first conduit, means for supporting said first conduit within said second conduit, a pipe member surrounding said second conduit and insulation means between said second conduit and said pipe means; said inner conduit of said transfer line having a male end portion at one end and a female end portion at the other end; the second outer conduit of said transfer line having a female end portion at the end adjacent the male end portion of said inner conduit and a male end portion at the end adjacent the female end portion of said inner conduit; the pipe member of said transfer line having bent over end portions contacting said outer conduit; a first connecter line attached to said storage vessel; said first connecter line having a first inner conduit, a second conduit surrounding said first conduit, means for supporting said first conduit within said second conduit, a pipe member surrounding said second conduit and insulation means between said second conduit and said pipe means; the inner conduit of said first connecter line having a male end portion engaged within the female end portion of the inner conduit of said transfer line; the outer conduit of said first connecter line having a female end portion engaging the male end portion of the outer conduit of said transfer line; said first connecter line pipe member having a bent over end portion adjacent the corresponding bent over end of said transfer line, a seal located between said bent over end portions; means attached to said pipe members for securing said transfer line to said connecter line and for compressing said seal between said bent over end portions; a second connecter line attached to said receiving vessel; said second connecter line having a first inner conduit, a second conduit surrounding said first conduit, means for supporting said first conduit within said second conduit, a pipe member surrounding said second conduit and insulation means between said second conduit and said pipe member; the inner conduit of said second connecter line having a female end portion engaging the male end portion of the inner conduit of said transfer line; the outer conduit of said connecter line having a male end portion engaging the female end portion of the outer conduit of said transfer line; said second connecter line pipe member having a bent over end portion adjacent the corresponding bent over end portion of said transfer line, a seal located between said last named bent over end portions; means, attached to said pipe members adjacent said last named bent over end portions, for securing said transfer line to said second connecter line and for compressing said seal between said last named bent over end portions; a return feed line connected between said receiving vessel and said second conduit of said second connecter line; and means, in said return feed line for controlling the pressure in the space between said first conduits and said second conduits of said transfer line and said first and said second connecter lines.

References Cited by the Examiner

UNITED STATES PATENTS

| | | | |
|---|---|---|---|
| 2,037,679 | 4/1936 | Dana | 137—339 X |
| 2,780,483 | 2/1957 | Kessler | 285—354 X |
| 2,933,333 | 4/1960 | Bredtschneider | 285—354 X |
| 3,066,803 | 12/1962 | Seils | 285—133 X |
| 3,152,452 | 10/1964 | Bond et al. | 137—375 X |
| 3,201,947 | 8/1965 | Post et al. | 62—55 |
| 3,207,533 | 9/1965 | Gundy et al. | 285—133 X |
| 3,250,297 | 5/1966 | Mooneyham | 137—375 X |

FOREIGN PATENTS 162,776  4/1958  Sweden.

M. CARY NELSON, *Primary Examiner.*

S. SCOTT, *Assistant Examiner.*